(12) United States Patent
Ravindranathan et al.

(10) Patent No.: US 11,645,605 B2
(45) Date of Patent: May 9, 2023

(54) CONTEXTUAL IOT WITH BLOCKCHAIN

(71) Applicant: SAP SE, Walldorf (DE)

(72) Inventors: Shyam Ravindranathan, Sunnyvale, CA (US); Anand Tekkam, Fremont, CA (US); Ramshankar Venkatasubramanian, Santa Clara, CA (US); Bipin Bihari Pandey, Cupertino, CA (US)

(73) Assignee: SAP SE, Walldorf (DE)

( * ) Notice: Subject to any disclaimer, the term of this patent is extended or adjusted under 35 U.S.C. 154(b) by 780 days.

(21) Appl. No.: 16/548,141

(22) Filed: Aug. 22, 2019

(65) Prior Publication Data

US 2021/0056501 A1 Feb. 25, 2021

(51) Int. Cl.

| | | |
|---|---|---|
| *G06Q 10/0832* | (2023.01) | |
| *G06F 16/182* | (2019.01) | |
| *G01K 1/022* | (2021.01) | |
| *G01K 1/02* | (2021.01) | |
| *G06Q 10/0833* | (2023.01) | |
| *H04L 9/06* | (2006.01) | |

(52) U.S. Cl.
CPC ......... *G06Q 10/0832* (2013.01); *G01K 1/022* (2013.01); *G01K 1/026* (2013.01); *G06F 16/182* (2019.01); *G06Q 10/0833* (2013.01); *H04L 9/0637* (2013.01)

(58) Field of Classification Search
CPC .... G06Q 10/08; G06Q 10/083; G06Q 10/087; G06Q 10/0832; G06Q 10/0833; G06Q 50/02; G06Q 50/04; G06Q 50/28; G06Q 20/36; G06Q 20/3823; G06Q 30/06; G06Q 30/0645; G06Q 40/08; G01K 1/02; G01K 1/022; G01K 1/026; G06F 16/182; G06F 16/27; G06F 17/30185; G06F 17/30522; G06F 17/30592; H04L 9/06; H04L 67/125; Y02P 90/50; H04W 4/38
USPC .......................................................... 709/224
See application file for complete search history.

(56) References Cited

U.S. PATENT DOCUMENTS

| | | | |
|---|---|---|---|
| 2017/0083583 A1* | 3/2017 | Huang | ................... G06F 16/283 |
| 2017/0319125 A1* | 11/2017 | Tsuji | ....................... A61B 5/162 |
| 2018/0220278 A1* | 8/2018 | Tal | ......................... H04L 9/3297 |

(Continued)

FOREIGN PATENT DOCUMENTS

CN 110148005 A 8/2019

OTHER PUBLICATIONS

The European Search Report dated Oct. 6, 2020 which was issued in a counterpart application EP Patent Application No. 20 188 539.9.

*Primary Examiner* — James N Fiorillo
(74) *Attorney, Agent, or Firm* — Buckley, Maschoff & Talwalkar LLC

(57) ABSTRACT

Provided is a system and method for writing IoT data of an object in transit and business context associated with the IoT data and/or the object to a blockchain. In one example, the method may include receiving sensor data of an object that is in a multi-party transactional process, identifying dynamic context of the object based on a current position of the object within the multi-party transactional process, generating a data block comprising the received sensor data of the object and the identified dynamic context of the object, and storing the data block within a blockchain on an immutable distributed ledger.

19 Claims, 7 Drawing Sheets

(56) References Cited

U.S. PATENT DOCUMENTS

| | | | |
|---|---|---|---|
| 2018/0232693 A1* | 8/2018 | Gillen | G06Q 10/0834 |
| 2018/0336515 A1* | 11/2018 | Mehring | H04L 9/0637 |
| 2019/0013948 A1* | 1/2019 | Mercuri | G06F 16/27 |
| 2019/0057454 A1* | 2/2019 | Komenda | G06Q 40/08 |
| 2020/0019923 A1* | 1/2020 | Santhar | G06Q 10/0832 |
| 2020/0036514 A1* | 1/2020 | Christensen | H04L 9/3297 |
| 2020/0051011 A1* | 2/2020 | Dasari | H04L 9/0637 |
| 2020/0184757 A1* | 6/2020 | Moeller | G07C 9/00571 |
| 2020/0269861 A1* | 8/2020 | Liftman | B60W 50/14 |
| 2022/0168154 A1* | 6/2022 | Dean | A61F 13/42 |

\* cited by examiner

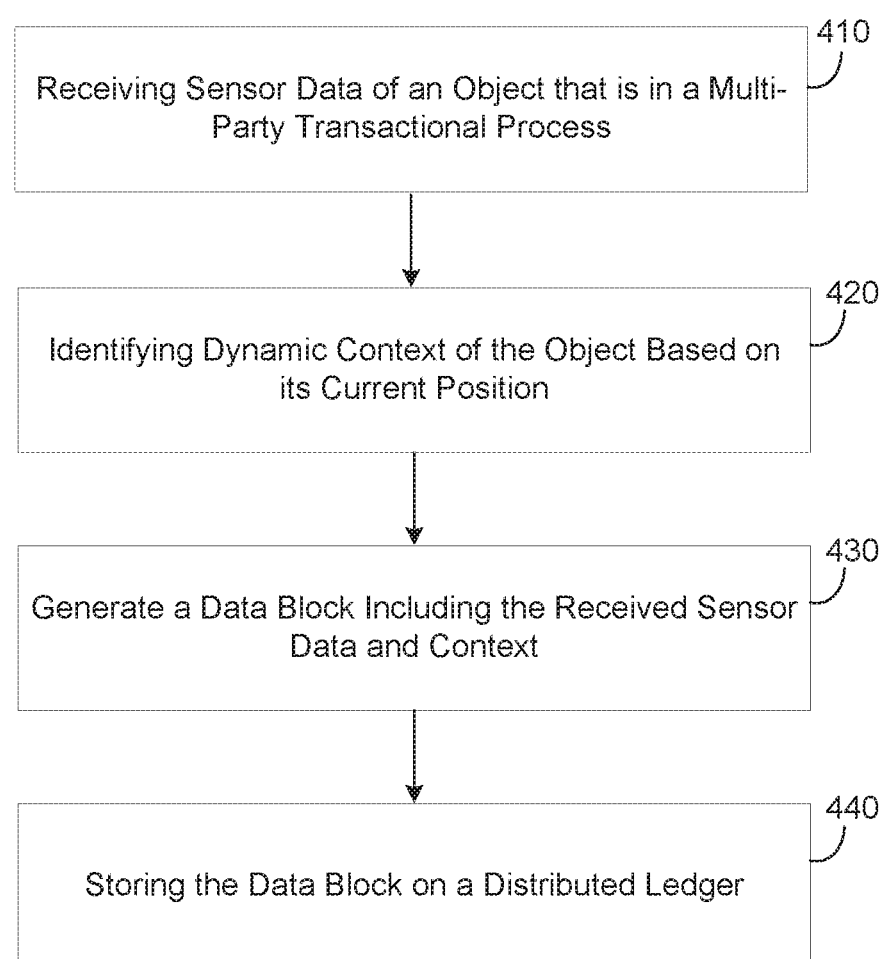

CONTEXTUAL IOT WITH BLOCKCHAIN

BACKGROUND

Blockchain provides significant benefits with respect to a traditional centralized database. For example, in a centralized database a single entity is in control of the data. In contrast, in blockchain no single entity is in control of the data, but rather a decentralized group of peer nodes (typically untrusting parties) must agree before data can be added to the blockchain. As another example, the blockchain itself is stored on a distributed ledger that is replicated among the peer nodes making it more fault-tolerant (i.e., due to the lack of a single point of failure) than a centralized database. Blockchain also provides increased security because the blocks themselves are linked to one another with hashes creating an immutable (i.e., tamper resistant) ledger.

Today's complex business networks may involve multiple parties in a transaction flow. For example, a supply chain can include inception of a product, delivery of the completed project, and every step in between. Supply chains can further include designers, manufacturers, storage, distributors, retailers, and the like. Each party to the supply chain has its own set of interests and responsibilities, and the parties might not trust one another. Accordingly, if an issue arises with the delivery of a product, involved parties may dispute the causes of the issue and their respective responsibilities in resolving the issue. What is needed is an improved mechanism for managing multi-party transactions flows and the corresponding data associated therewith.

BRIEF DESCRIPTION OF THE DRAWINGS

Features and advantages of the example embodiments, and the manner in which the same are accomplished, will become more readily apparent with reference to the following detailed description taken in conjunction with the accompanying drawings.

FIG. 4 is a diagram illustrating a method of generating and storing contextual data of an object on a blockchain in accordance with an example embodiment.

Figure 1A:
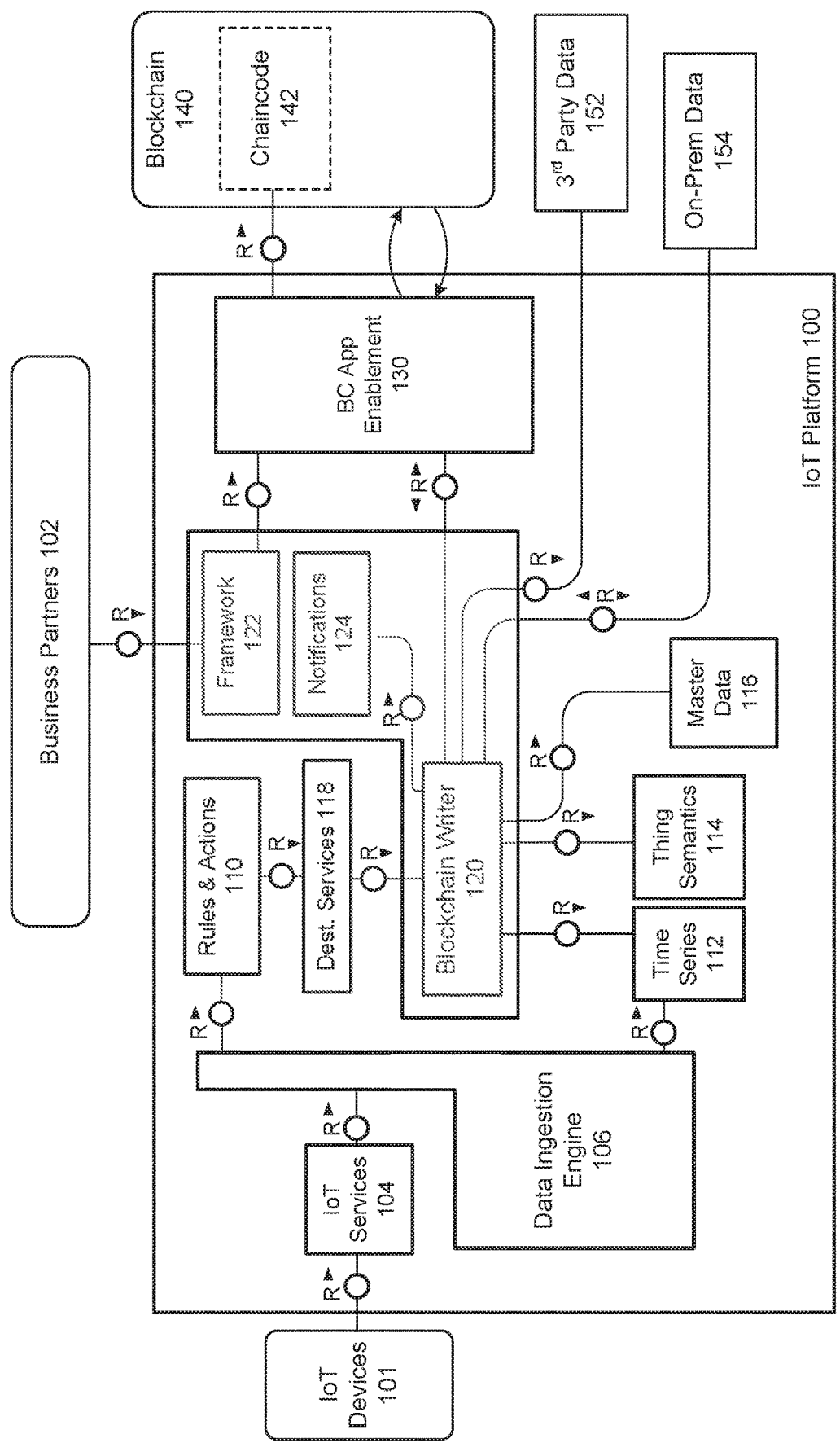
FIG. 1A is a diagram illustrating an architecture including an Internet of Things (IoT) platform in accordance with an example embodiment.

Throughout the drawings and the detailed description, unless otherwise described, the same drawing reference numerals will be understood to refer to the same elements, features, and structures. The relative size and depiction of these elements may be exaggerated or adjusted for clarity, illustration, and/or convenience.

DETAILED DESCRIPTION

In the following description, specific details are set forth in order to provide a thorough understanding of the various example embodiments. It should be appreciated that various modifications to the embodiments will be readily apparent to those skilled in the art, and the generic principles defined herein may be applied to other embodiments and applications without departing from the spirit and scope of the disclosure. Moreover, in the following description, numerous details are set forth for the purpose of explanation. However, one of ordinary skill in the art should understand that embodiments may be practiced without the use of these specific details. In other instances, well-known structures and processes are not shown or described in order not to obscure the description with unnecessary detail. Thus, the present disclosure is not intended to be limited to the embodiments shown but is to be accorded the widest scope consistent with the principles and features disclosed herein.

Multi-party business processes, such as a supply chain, or the like, often involve multiple untrusting parties coming together for a collaborative venture. In the example of a supply chain, the parties usually perform sequential actions in the production and distribution of a product such as a manufactured good. The supply chain may include all aspects from inception of the product, transformation of raw materials, manufacture of the product, storing of the product, distribution of the product, supplying of the product, retail sales of the product, and the like. The product may progress from party-to-party as it transitions through the supply chain. In more sophisticated supply chains, a product may re-enter the supply chain at a point where residual value can be achieved.

A cold chain is a type of supply chain in which the parties involved are required to maintain a product within a specified temperature range or otherwise in a temperature-controlled environment. Examples of temperature regulated products include perishable food items, chemical compositions, pharmaceuticals, and the like. When these items are supplied or purchased in bad/poor condition, it can be difficult to ascribe blame to one party or another because it can be difficult to determine when the product went bad and thus, who is responsible for the degradation.

The example embodiments provide an Internet of Things (IoT) blockchain system which provides automated and immutable transparency among different (and often untrusting) parties involved in a common transactional process such as a supply chain. Within the multi-party process, different parties may perform different roles in the manufacture, distribution, storage, supply, retail, and the like, of products. As described herein products include tangible objects such as food, clothing, raw materials, chemicals, medication, and the like. The IoT blockchain may receive sensor data captured of the object as it moves throughout the multi-party transactional process. Each party may include readers and/or other equipment capable of measuring data attributes of the product (temperature, geo-location, pressure, humidity, etc.) and transmit the measured data to a host platform of the IoT blockchain. In response, a blockchain writer can automatically add the sensor data to the IoT blockchain. Here, the IoT blockchain may be hosted on a platform that is central to or that otherwise receives data from the different parties involved in the multi-party transaction. Therefore, each of the parties may upload data to the blockchain as it moves from one party to the next.

In addition, the IoT blockchain system can analyze the sensor data, master data, third-party data, and other data sources, to generate business-related context about the object at its current position in the process. The IoT blockchain can trigger storage of both the sensor data in combination with the business context. As a result, the IoT blockchain can provide immutable sensor data along with relevant context associated with the sensor data during the step-by-step journey of an object through multiple "hands" of a multi-party transactional process. The blockchain provides immutable proof of the underlying causes of damage to a product and it is not controlled by any one authority and such cannot be modified without a consensus among the parties involved.

The sensor data may include any type of time-series data such as temperature, humidity, pressure, movement (geo-location over time), and the like. The IoT blockchain may correlate the sensor readings with context, for example, a type of material included in the object, an identifier of a transport (truck, train, plane, ship, etc.) on which the object is being transported, a sales order identifier, a current business party in possession of the object, and the like. The context can provide a business view of the sensor data thereby enabling users to both know the physical measurements as well as the party that is associated with the measurements.

In addition, the IoT blockchain can implement constraints/rules which are agreed upon by the parties involved prior to entering into the multi-party transactional process. When the sensor data is fed back to the platform, the IoT blockchain system can determine whether these constraints have been violated at any time in the process. For example, the IoT blockchain can detect that a product was stored above its required temperature for a period of time that exceeds a predetermined constraint and generate a notification informing the participants of the breach in real-time as the breach occurs. This allows the parties to cancel the contract, take remedial action, identify damages, and the like.

Blockchain is a database technology (i.e., a distributed ledger) that enables participants (i.e., nodes) to hold copies of the stored data. For example, each of the parties involved in the multi-party transaction may include nodes on the blockchain. Also, additional parties may be included in the blockchain such as insurers, etc. The blockchain nodes may be distributed creating a decentralized network. Blockchain functions such as reading data from, writing data to, copying data from the blockchain, etc. are managed in a manner that participants are comfortable with the integrity and authenticity of the data stored on chain. These scenarios assume that participants have access or can gain access to the chain data.

The blockchain includes an immutable data structure resembling a distributed ledger capable of maintaining records between mutually untrusted parties. The distributed ledger may be overridden such as minority forks in the chain, but such action must be approved by consensus of the blockchain participants. The untrusted parties are referred to herein as peers or peer nodes. Each peer may maintain a copy of the database records and no single peer can modify the database records without a consensus being reached among the distributed peers. For example, the peers may execute a consensus protocol to validate blockchain storage transactions, group the storage transactions into blocks, and build a hash chain over the blocks. This process forms the ledger by ordering the storage transactions, as is necessary, for consistency. In various embodiments, a permissioned and/or a permissionless blockchain can be used. A permissioned blockchain database provides secure interactions among a group of entities which share a common overall process, but which do not fully trust one another, such as businesses that exchange funds, goods, information, and the like.

The nodes may perform a logical function and different types can run on the same physical server. The nodes may include different types, such as a client or submitting-client node which submits a transaction-invocation (document, etc.) to an endorser (e.g., peer), and broadcasts transaction-proposals to an ordering service (e.g., ordering node). Another type of node is a peer node which can receive client-submitted transactions, commit the transactions and maintain a state and a copy of the ledger of blockchain transactions. Peers can also have the role of an endorser, although it is not a requirement. An ordering-service-node or orderer is a node running the communication service for all nodes, and which implements a delivery guarantee, such as a broadcast to each of the peer nodes in the system when committing transactions and modifying a world state of the blockchain, which is another name for the initial blockchain transaction which normally includes control and setup information.

State transitions may result from chaincode invocations (i.e., transactions) submitted by participating parties (e.g., client nodes, ordering nodes, endorser nodes, peer nodes, etc.). Each participating party (such as a peer node) can maintain a copy of the ledger. A transaction may result in a set of asset key-value pairs being committed to the ledger as one or more operands, such as creates, updates, deletes, and the like. The distributed ledger includes a blockchain (also referred to as a chain) which is used to store an immutable, sequenced record in blocks. The ledger also includes a state database which maintains a current state of the blockchain.

The chain itself may include a transaction log which is structured as hash-linked blocks, and each block contains a sequence of N transactions. A block header may include a hash of the block's transactions, as well as a hash of the prior block's header. In this way, all transactions on the ledger may be sequenced and cryptographically linked together. Furthermore, a hash of a most recently added blockchain block represents every transaction on the chain that has come before it, making it possible to ensure that all peer nodes are in a consistent and trusted state. The chain may be stored on a peer node file system (i.e., local, attached storage, cloud, etc.), efficiently supporting the append-only nature of the blockchain workload.

All participants in product delivery including manufacturers, storage, distributors, etc. can be part of the IoT blockchain described herein and can write data to the blockchain to establish trust. Once a product is manufactured, there is a change of hands from the manufacturer to other parties such as logistics provider (deliverer), storage, retailers, custom agents, and the like. The product (e.g., a palette carrying the product, etc.) may have sensors attached to it which can be read by equipment disposed at the part locations. The sensors may include RFID sensors, temperature sensors, geo-location sensors, and the like. The sensor data may be forward to the IoT blockchain via a network and stored on the distributed ledger.

When parties exchange control over the product, this "change of hands" can be captured by one or both of the participants and recorded as a transaction on the blockchain. Furthermore, the sensors on the product can send back readings during transport such as temperature, humidity, etc. Chemical-based products have limitations on how long they can be outside a specific temperature, etc. For example, a product can only stay about 80 degrees for 4 minutes or less, etc. These constraints can be imposed by the IoT blockchain (e.g., smart contracts executing on peer nodes, etc.) and the IoT blockchain can determine if and when any of these constraints have been violated. All the parties that are participants to the IoT blockchain can see the conditions of the product as it moves down the line.

Figure 1B:
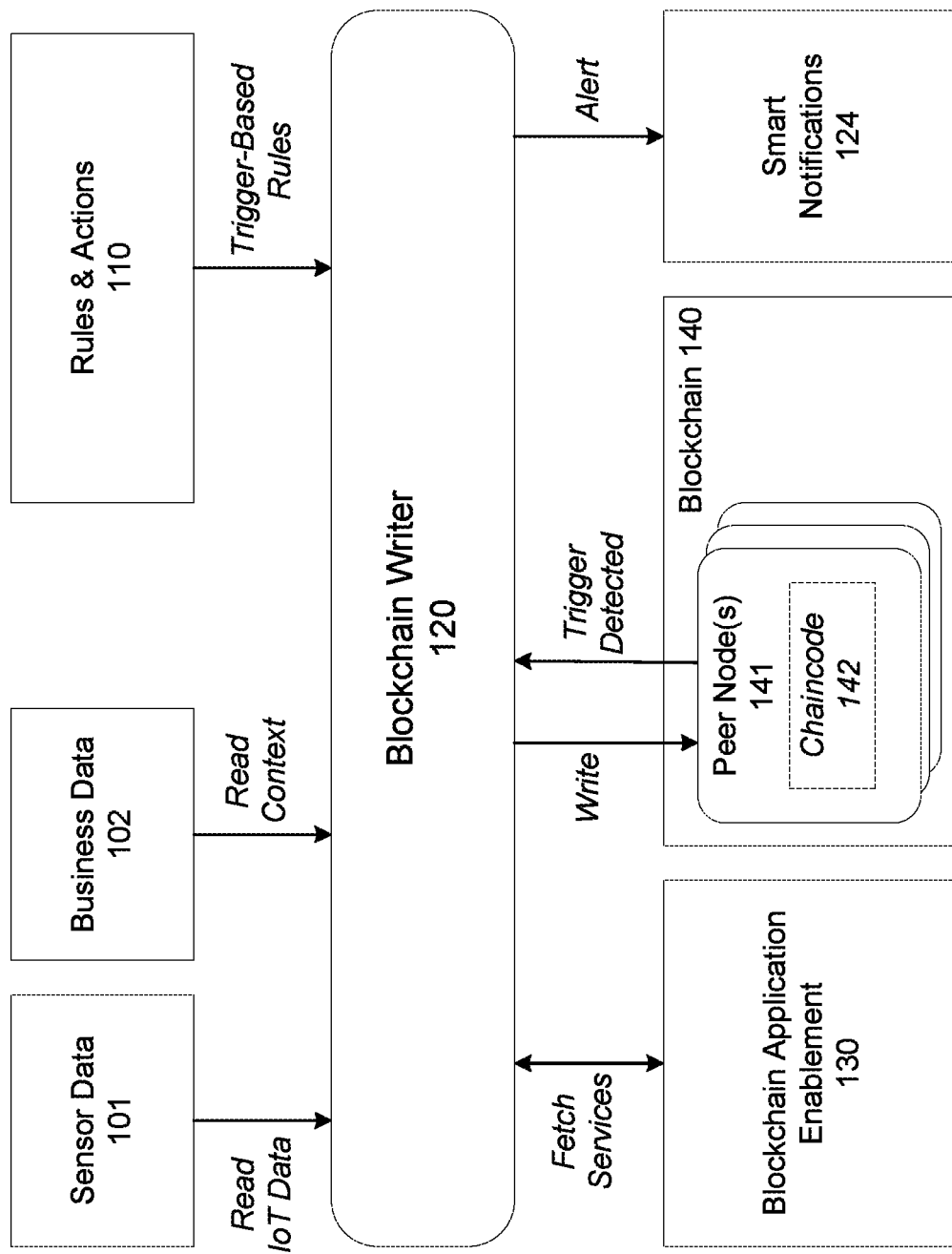
FIG. 1B is a diagram illustrating a process performed by a blockchain writer of the IoT platform in FIG. 1A, in accordance with an example embodiment.

FIG. 1A illustrates an architecture including an Internet of Things (IoT) platform 100 in accordance with an example embodiment, and FIG. 1B illustrates a process 160 performed by a blockchain writer of the IoT platform 100 in accordance with an example embodiment. Referring to FIG. 1A, IoT devices 101 such as sensors, readers, and the like, provide data from an object as it moves through a multi-party transactional process. The sensor data may be read or otherwise received by IoT services 104 and ingested by a data ingestion engine 106 into host platform 100. The sensor data is then combined with rules and actions 110 which identify pre-established constraints associated with the multi-party transaction process (e.g., temperature control, geographical control, etc.) A destination service(s) 118 provides APIs that can be used to read and manage destinations and certificates. The destination services 118 can show all available endpoints of the multi-party transaction process, the supported operations, parameters, and possible error causes. The sensor data and the constraints associated therewith are fed into a blockchain writer 120.

In addition to the sensor data, the blockchain writer 120 also receives contextual data such as historical time-series (sensor) data 112, semantic data 114, master data 116, third party data 152, on-premises data 154, and the like. These data sources can provide information including an identification of which party is currently in control of the product, transport information, sales order information, points in time or places along the process where the object is to change hands between two parties, geographical information of the object, and the like.

The IoT platform 100 includes new components such as a smart contract framework 122, the blockchain writer 120, and a smart notifications 124 component which enable decentralized management of contracts orchestrated by the IoT platform 100 and which help capture contextual data from hybrid cloud environments. Smart notifications 124 allow distributed relay of messages to all subscribers in the multiparty blockchain. The notifications may alert parties when the sensor data indicates a breach in a pre-existing contract as well as the context associated with such a breach.

The smart contract framework 122 helps in framing smart contracts that are accessible by all parties/business partners 102 participating in blockchain. Parties agree on the contract definition, and once approved, these contracts are written as chain codes 142 (self-executable distributed code on blockchain 140) and cannot be altered by any one individual party. Once the chaincode 142 is written to the blockchain 140, all parties 102 writing data to the distributed network of blockchain nodes will need to abide by it.

A blockchain enablement application 130 provides a bridge between the IoT platform 100 (e.g., the blockchain writer 120) and the blockchain 140. This component enables data to be written and read from the blockchain 140 (e.g., peer nodes thereof, etc.). The blockchain enablement application 130 also enables smart contracts created by the smart contract framework 122 to be deployed onto the peer nodes of the blockchain 140 as chaincode 142. The blockchain enablement application 130 is generic in that any underlying blockchain technology such as proof of history, proof of status, etc., can be implemented, depending on the use case and capabilities provided by the blockchain vendors being relied.

In the examples described herein, the integration of the IoT platform 100 and the blockchain 140 addresses the need for automation, transparency and security for IoT enabled business processes in a multi-party business transaction. The blockchain 140 can record and provide insight into business-to-business (or party-to-party) interaction powered by IoT. The parties involved can share infrastructure with different entities belonging to different organizations (cross organizational entities) which is implemented by the decentralized technology infrastructure of the blockchain 140.

FIG. 1B illustrates an example of a process 160 which may be implemented in part by the blockchain writer 120. Referring to FIG. 1B, the blockchain writer 120 receives sensor data 101 (e.g., telemetry data) and exceptions/conditions from the rules and actions component 110. The blockchain writer 120 may correlate the received sensor data 101 with business data 102 such as sales order data, business partner data (vehicle information, possession information, location information, etc.), and the like, which is associated with the sensor data 101 in some way. For example, the sensor data 101 and the business data 102 may be correlated based on time, location, control, and the like. The blockchain writer 120 may detect as to when an object such as an asset or material changes hands from one business partner to another based on the sensor data 101 and the business data 102, and then trigger IoT sensor values into the blockchain node 141 of the blockchain 140 at that point of time based on permissions available to the participant, thus enabling access for real-time data for blockchain participants.

Data may be assembled in real time enabling entities participating in the blockchain network to quickly take corrective actions via self-executing IoT chain code 142 on the blockchain nodes 141 of the blockchain 140. The host platform provides a framework where all parties participating the de-centralized blockchain network agree on a set of rules which can be defined in the host platform (smart contract framework 122) and then deployed to chaincode 142 running on the blockchain (such as stability budget, which states that temperature of the material will not exceed 15 degrees for more than 10 minutes as it moves through the supply chain).

The framework provides a way these rules can be configured centrally and agreed upon by the participants based on a workflow. Once agreed upon, the business contract with IoT streaming rules and business data correlation is pushed into the blockchain 140 to operate autonomously as self-executing chaincode 142 embedded in the blockchain nodes 141 and orchestrated from the host platform. In addition, the self-executing blockchain writer 120 also ensures that once a business process is compromised due to violation of agreed upon rules, then it enforces corrective action by disabling other participants from writing to the blockchain 140. Here, the IoT chaincode 142 running on the blockchain peers 141 can communicate with the blockchain writer 120 (e.g., which may be running in the cloud, etc.) to relay this information which can be then propagated to all the participants so that information is distributed in real-time by smart notification services 124 and everyone can take appropriate actions for mitigation. Distributed processing of IoT sensor data 101 correlated with business data 102 in the cloud and embedded as chaincode 142 in the blockchain 140 enables the real-time blockchain.

During the write, the blockchain writer 120 may have access to current and historical telemetry data from the physical device. The blockchain writer 120 may also have access to the digital twin's semantic data and associated business data. This provides a powerful data source for recording an event into the blockchain 140 with complete context and further augmenting it with external data such as geo-spatial, weather, etc. Whenever any smart contract is breached (identified by the self-executing chaincodes 141), the blockchain writer 120 may be notified of such an event. Accordingly, the blockchain writer 120 may create an alert and notify all subscribed parties through smart notification services 124 with the details of the breach of the smart contract to enable any options under the contract duties such as mitigation of damages, cancellation of contract, new orders, etc.

Figure 2:
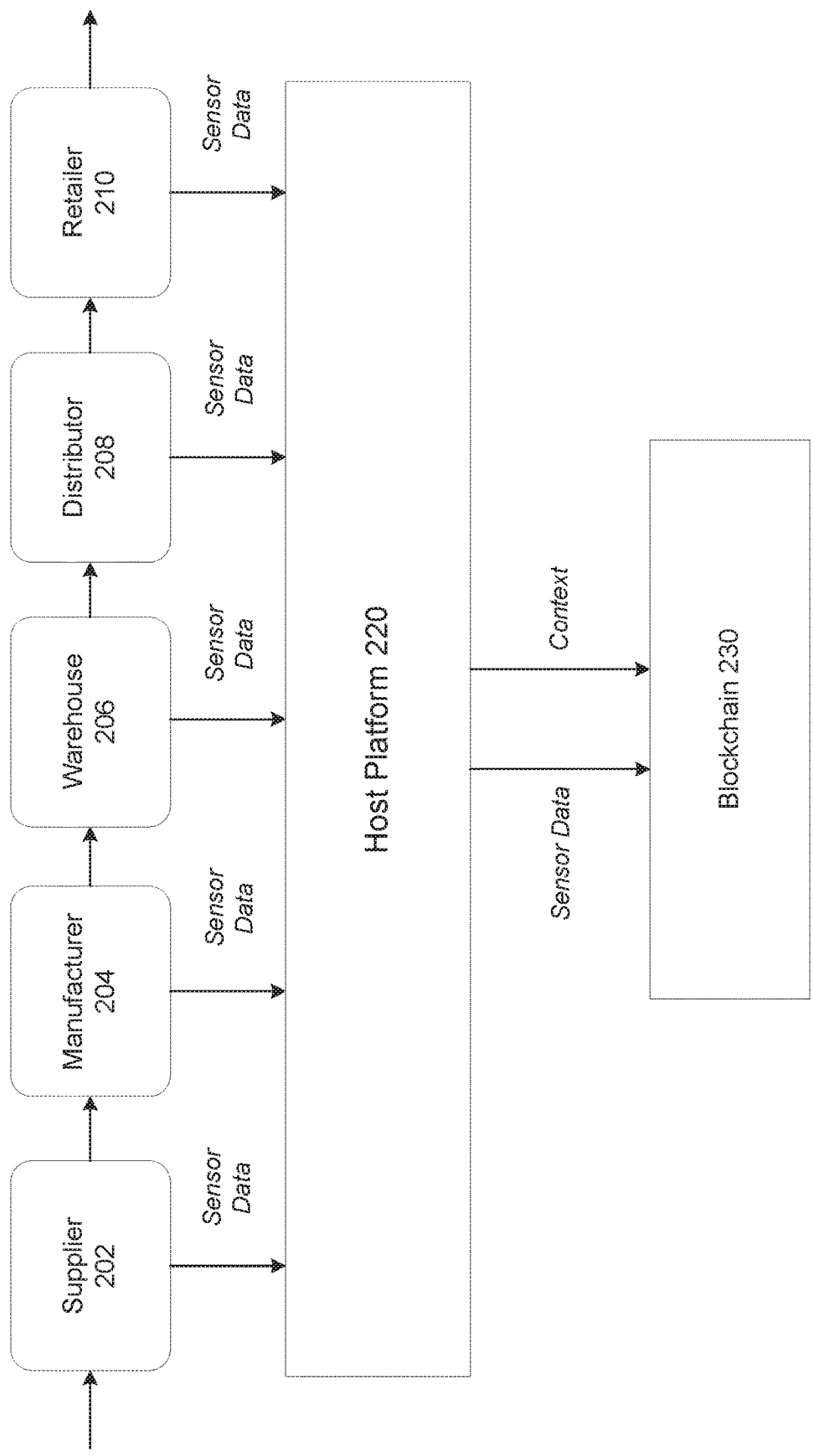
FIG. 2 is a diagram illustrating a multi-party transactional process communicating with a blockchain in accordance with an example embodiment.

FIG. 2 illustrates a multi-party transactional process 200 in which a chain of business entities communicate with a blockchain 230 in accordance with an example embodiment. Referring to FIG. 2, a supply chain includes a supplier 202 of raw materials, a manufacturer 204 of a product, a warehouse 206 for storing the manufactured product, a distributor 208 for delivering the product to retailers 210 where the product can be purchased. As the product (object) moves through the process 200, the parties may capture sensor data and feed the sensor data back to a host platform 220. Furthermore, the host platform 220 may identify business context associated with the sensor data and pair the sensor data with the context. The pair may be stored on the blockchain 230.

Traceability of materials/assets/products or goods of any kind is a burning requirement in a constantly evolving business environment with a globally distributed supply chain. In the example of FIG. 2, the supply chain involves multiple parties 202-210. These entities may cut across organizational and geographical boundaries and use different systems, infrastructure and processes for keeping on top of their supply chain needs. The participating entities in a complex supply chain, thus bring their own tools and processes to the table which makes oversight very difficult to achieve.

The IoT enabled blockchain network implemented by the host platform 220 provides a common set of rules and processes for all participants 202-210. The blockchain 230 provides a shared ledger to record location and quality of materials as they move among the participants 202-210. Sensor based detection of quality of materials and location is a trusted source of data and IoT brings this situationally aware and real-time data to all the participants 202-210. The host platform 220 may include rules and logic to orchestrate decisions and actions as sensor data is received. The rules and actions can be configured centrally in the host platform 220 and deployed to the blockchain 230 to run as independent, self-executing pieces of code. The chaincode deployed on the blockchain 230 can then trace the material properties and write it to blockchain 230 as it passes through the hands of different entities 202-210.

In one embodiment, the host platform 220 may detect context associated with the sensor data as it is read and provided to the host platform 220. The context may include information that is retrieved from local storage of the host platform 220 as well as outside data sources such as data stores of the supplier 202, the manufacture 204, the warehouse 206, the distributor 208, and/or the retailer 210. Here, the host platform 220 may record sensor data as control over the product moves in sequence among the supplier 202, the manufacture 204, the warehouse 206, the distributor 208, and/or the retailer 210. At each stage, the host platform 220 may read sensor data and also generate context associated with the stage. In the example of a cold chain, the sensor data may include temperature information, and the context may include a sales order identifier, a party identifier from among the different parties 202-210, a material ID, a vehicle ID on which the product is travelling, and the like.

Regulations around traceability in industries like pharmaceuticals (logistics issues, cold chain and spurious medication) and food safety (farm to fork traceability) also drives the need for a transparent and traceable way to track and share trusted information to all participants and customers on information like point of origin of the product and how it was handled and processed throughout the supply chain.

In the example of FIG. 2, if one of the parties 202-210 breaches the conditions established and stored as chaincode on the blockchain 230, the blockchain writer can be notified and a smart notification can be delivered to each of the parties 202-210. For example, the parties 202-210 may be involved in a temperature controlled chain with the following constraints:

TABLE 1

| Product | Temp Min | Temp Max | Duration | Action |
| --- | --- | --- | --- | --- |
| A | none | 32° F. | 10 minutes | Breach/notify |
| B | 45° F. | 55° F. | 15 minutes | Breach/Notify |
| C | 60° F. | 65° F. | 2 minutes | Notification |

In this example, if any of the parties violates the rules set forth in Table 1 above, the blockchain writer can act to notify all parties involved. In this example, the rules specify a temperature or a range of temperatures of an environment where a product must be kept/maintained. In this example, the participants 202-210 may transmit temperature data captured by one or more sensors (thermometers, etc.). If the product falls outside of this established range for a predetermined duration or more, then a notification (and possibly a breach) has occurred. In this case, the blockchain writer on the host platform 220 can trigger smart service to notify each of the participants 202-210 of the breach/notification when it occurs.

In some embodiments, the amount of time which a product remains out of a specified threshold may be referred to as a stability budget, or out of refrigeration time (for perishable item, etc.) In the example of Table 2, Product C only has a budget duration of 2 minutes for out of refrigeration time. Here, the system may send a simple notification to one or more parties indicating a brief lapse out of the refrigeration time but may not need a breach notification at this point. Meanwhile, Product B with a duration of 15 minutes out of refrigeration time represents a breach of a stability budget and requires a breach notification to all stakeholders. In some cases, the responsibility for the breach may be shared by multiple parties. The IoT data stored on the blockchain described herein may help identify that a multi-party breach has occurred instead of a single party breach, as well as assign percentage of responsibility of damage to the product to each party among the multiple parties.

Figure 3A:
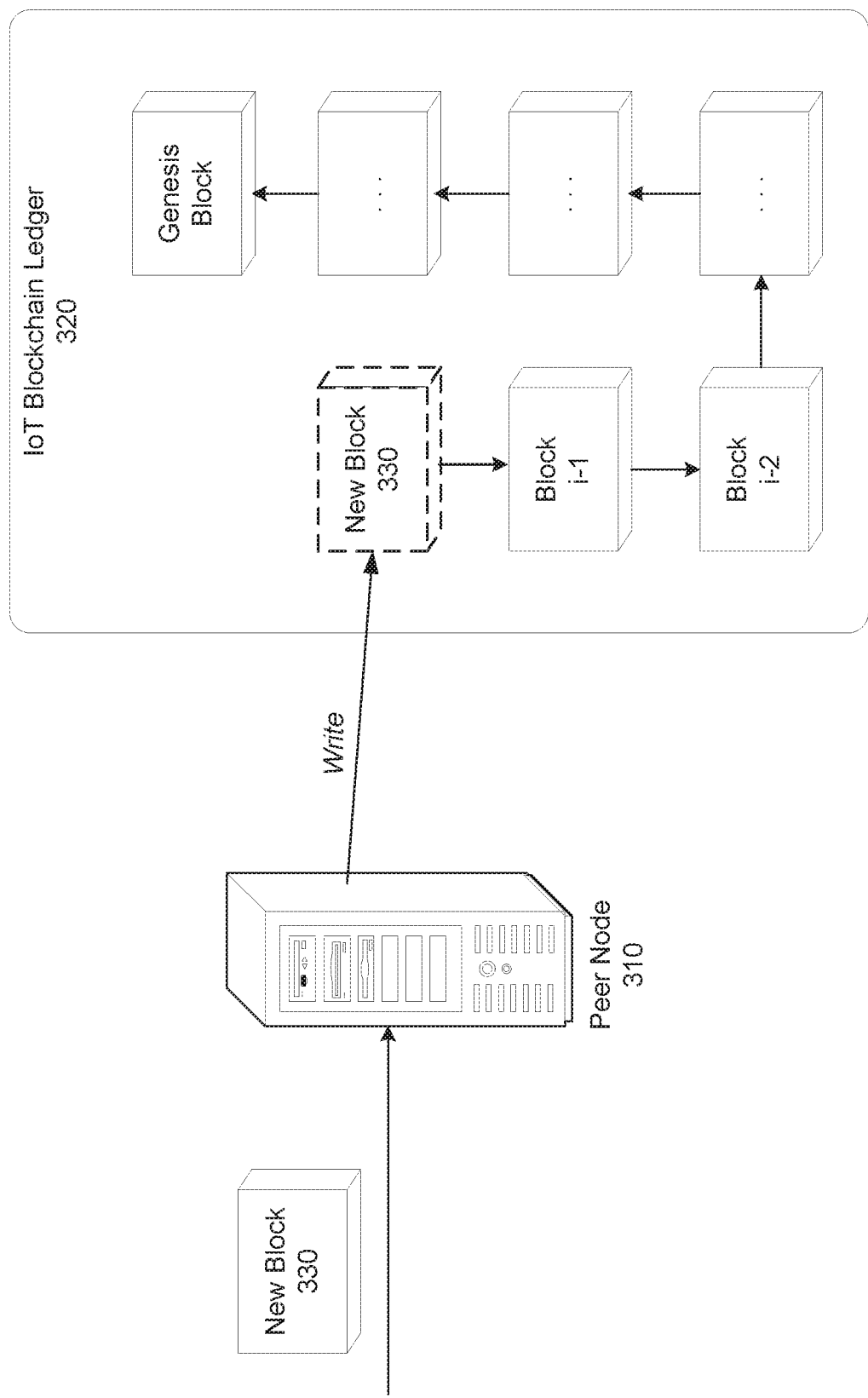
FIG. 3A is a diagram illustrating a process or storing a block on an IoT blockchain in accordance with an example embodiment.
Figure 3B:
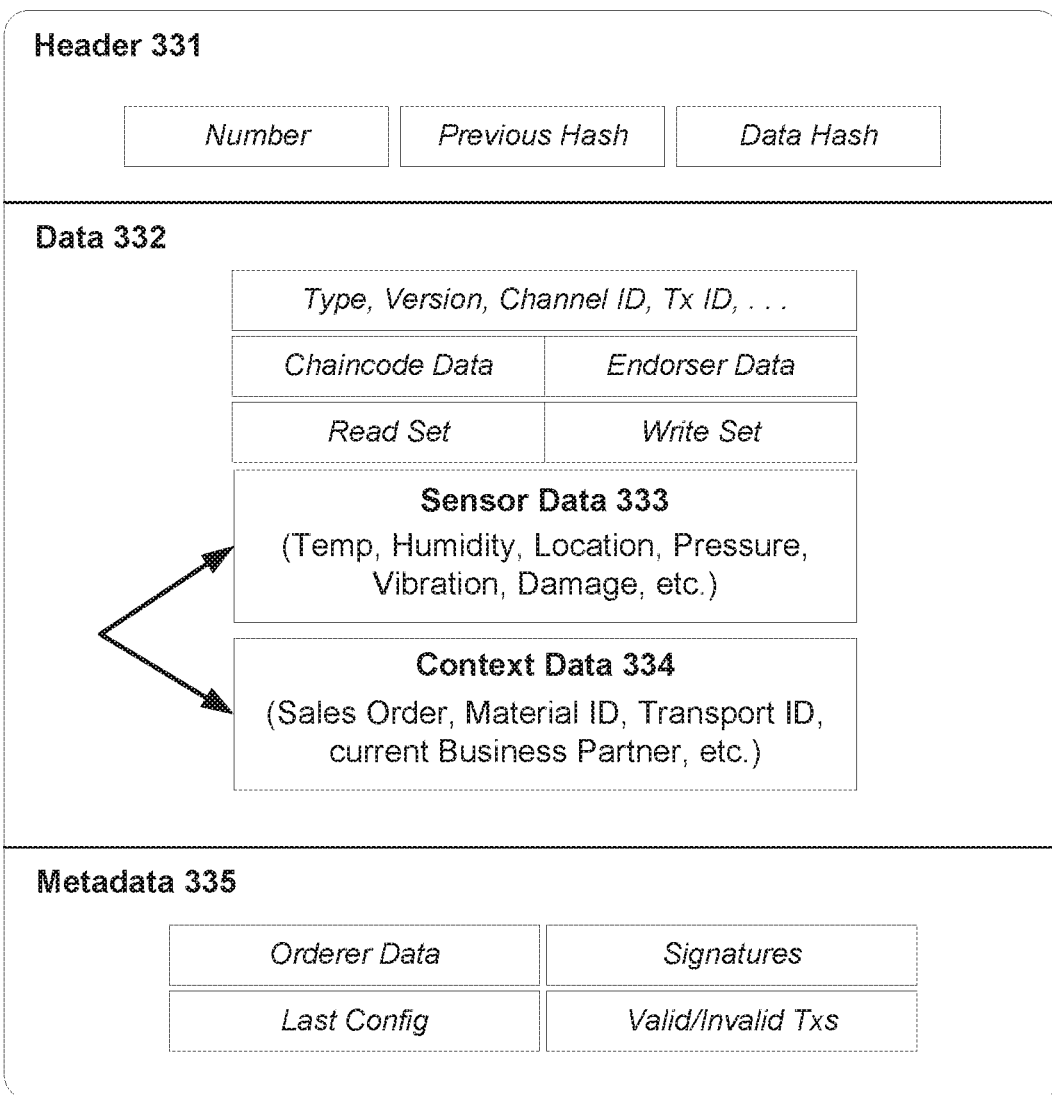
FIG. 3B is a diagram illustrating a structure of a data block in accordance with an example embodiment.

FIG. 3A illustrates a process 300 of a new block 330 being added to a distributed ledger 320 which stores an IoT blockchain, in accordance with example embodiments, and FIG. 3B illustrates contents of a block structure 330 for blockchain, in accordance with example embodiments. Referring to FIG. 3A, clients (not shown) which may include the parties to a supply chain, the sensors, etc., may submit transactions to the blockchain. As described herein, a client may be a system such as software, hardware, etc., and may include instructions received from any source to enact activity on the blockchain. A plurality of blockchain peers (e.g., blockchain node 310) may maintain a state of the blockchain network and a copy of the distributed ledger 320.

Different types of blockchain nodes/peers may be present in the blockchain network including endorsing peers which simulate and endorse transactions proposed by clients and committing peers which verify endorsements, validate transactions, and commit transactions to the distributed ledger 320. In this example, the blockchain node 310 may perform the role of endorser node, committer node, or both.

In the example of FIG. 3A, a new data block 330 has been generated by an ordering service (not shown). The data block 330 comprises a plurality of transactions which may include sensor readings and context associated therewith. The number of transactions stored in the data block 330 is not limited to any particular number. In this example, the distributed ledger 320 includes a blockchain which stores immutable, sequenced records in blocks. The blockchain is a transaction log, structured as hash-linked blocks where each block contains a sequence of N transactions. Blocks may include various components such as shown in FIG. 3B. The linking of the blocks (shown by arrows in FIG. 3A) may be generated by adding a hash of a prior block's header within a block header of a current block. In this way, all transactions on the blockchain are sequenced and cryptographically linked together preventing tampering with blockchain data without breaking the hash links. Furthermore, because of the links, the latest block in the blockchain represents every transaction that has come before it. The blockchain may be stored on a peer file system (local or attached storage), which supports an append-only blockchain workload.

When the ordering service initializes the new data block 330, the new data block 330 may be broadcast to committing peers (e.g., blockchain peer node 310, etc.) In response, each committing peer validates the transaction within the new data block 330 by checking to make sure that the read set and the write set still match the current world state in a state database. Specifically, the committing peer can determine whether the read data that existed when the endorsers simulated the transaction is identical to the current world state in the state database. When the committing peer node 310 validates the block of transactions, the block 330 is added to the blockchain on the distributed ledger 320, and the state database is updated with the write data from the read-write set. If a transaction fails, that is, if the committing peer node 310 finds that the read-write set does not match the current world state in the state database, the transaction ordered into a block will still be included in that block, but it will be marked as invalid, and the state database is not updated.

As further shown in FIG. 3B, the data block 330 may include multiple data segments such as a header portion 331, data portion 332, and a metadata portion 333. Each transaction stored in the data block 330 may include store transactional within the data section 332. The data block 330 may also include a link to a previous block (e.g., on the blockchain in FIG. 3A) within the header portion 331. The header portion 331 may also include a unique block number, a hash of the data section 332 of the data block 330, and the like. The block number of the new data block 330 may be unique and assigned in various orders, such as an incremental/sequential order starting from zero.

The data section 332 may store transactional information of each transaction which may include one or more of a type of the transaction, a version, a timestamp, a channel ID of the distributed ledger 320, a transaction ID, an epoch, a payload visibility, a chaincode path (deploy tx), a chaincode name, a chaincode version, input (chaincode and functions), a client (creator) identity such as a public key and certificate, a signature of the client, identities of endorsers, endorser signatures, a proposal hash, chaincode events, response status, namespace, a read set (list of key and version read by the transaction, etc.), a write set (list of key and value, etc.), a start key, an end key, a list of keys, a Merkel tree query summary, and the like. The transaction data may be stored for each of the N transactions.

The metadata section 335 may store multiple fields of metadata (e.g., as a byte array, etc.). Metadata fields may include signature on block creation, a reference to a last configuration block, a transaction filter identifying valid and invalid transactions within the block, last offset persisted of an ordering service that ordered the block, and the like. The signature, the last configuration block, and the orderer metadata may be added by the ordering service.

In addition, according to various embodiments, the data block 330 may also store sensor data 333 and business context 334 that is associated with the sensor data 333. In this example, the sensor data 333 and the context 334 are stored in the data section 332 of the data block 330, however, it should be appreciated that the sensor data 333 and context 334 may be stored in the header section 331 or the metadata section 335, as well. In this example, the sensor data 333 may include temperature, humidity, geo-location, pressure, vibration, damage information, and the like. Meanwhile, the context 334 may include a sales order identifier, a material type, a transport ID, a business partner associated with the sensor data, and the like.

FIG. 4 illustrates a method 400 of generating and storing contextual data of an object on a blockchain in accordance with an example embodiment. For example, the method 400 may be performed by an application or other program that is executing on a database node, a cloud platform, a server, a computing system (user device), a combination of devices/nodes, or the like. Referring to FIG. 4, in 410, the method may include receiving sensor data of an object that is in a multi-party transactional process. For example, the sensor data may include one or more of temperature, vibration, pressure, and geo-location captured of the object at the current position within the multi-party transactional process.

In 420, the method may include identifying dynamic context of the object based on a current position of the object within the multi-party transactional process. The context may provide business context that is associated with the object as it is transitioned from one party to another in the multi-party transactional process. The context may establish fault when the object is improperly handled and may be stored on the blockchain ledger in an immutable fashion that cannot be manipulated by an individual party. In some embodiments, the identifying the dynamic context may include identifying one or more of a type of material of the object, a vehicle identifier of a current transport, a party identifier, and an order identifier. In some embodiments, the identifying the dynamic context may include dynamically identifying which party within the multi-party transactional process currently has possession of the object. In some embodiments, the identifying the dynamic context may include dynamically identifying a change in possession of the object from one party to another party in the multi-party transactional process.

In 430, the method may include generating a data block which includes the received sensor data of the object and the identified dynamic context of the object. In 440, the method may include storing the data block within a blockchain on a distributed ledger. The notification may alert one or more parties in the process that another party within the process has violated the constraints which were agreed upon. The notification may allow the other parties to take immediate remedial action such as to cancel the delivery or shipment of goods, mitigate the damages such as by requesting another order to make up for the loss, and the like.

In some embodiments, the object may include a temperature-controlled object product, the sensor data comprise temperature data, and the dynamically identifying may include determining whether a current temperature at the current position of the object satisfies a predetermined temperature constraint. In some embodiments, the method may further include determining that the dynamically identified context of the object violates a pre-established constraint of the multi-party transactional process. In this example, the method may further include transmitting an alert to one or more parties of the multi-party transactional process indicating that the pre-established constraint has been violated. In some embodiments, the method may further include storing information about the violation of the pre-established constraint within a data block in the blockchain on the distributed ledger.

Figure 5:
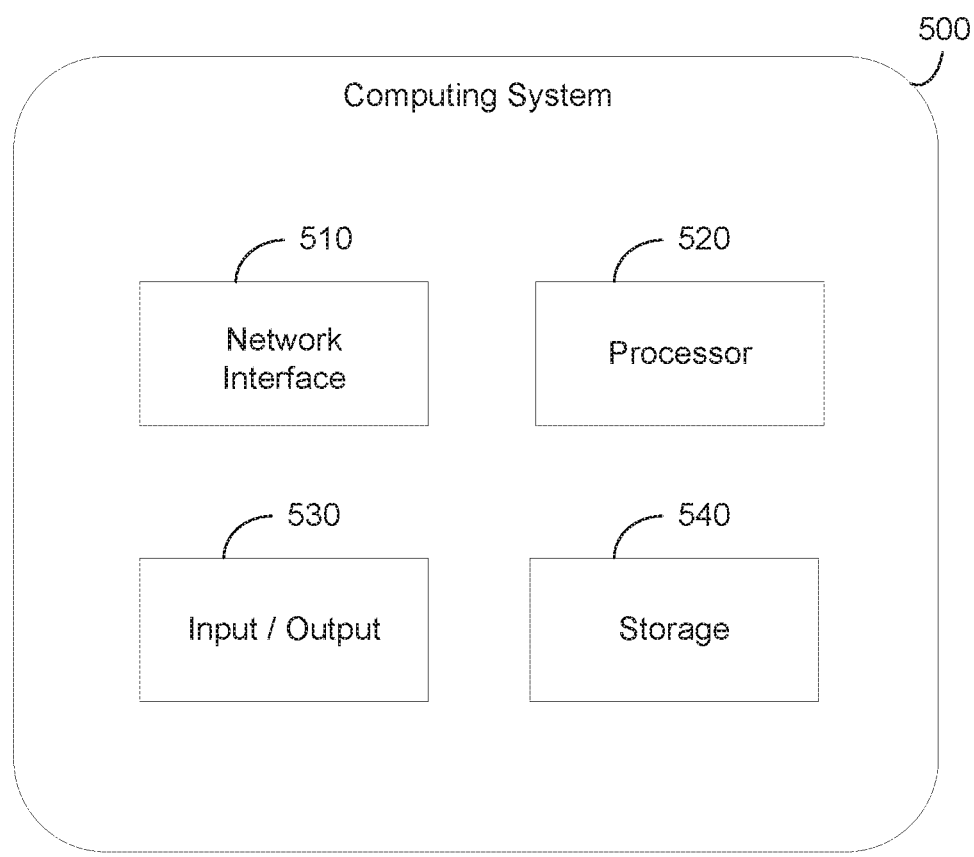
FIG. 5 is a diagram illustrating a computing system for use in the examples herein in accordance with an example embodiment.

FIG. 5 illustrates a computing system 500 that may be used in any of the methods and processes described herein, in accordance with an example embodiment. For example, the computing system 500 may be a database node, a server, a cloud platform, or the like. In some embodiments, the computing system 500 may be distributed across multiple computing devices such as multiple database nodes. Referring to FIG. 5, the computing system 500 includes a network interface 510, a processor 520, an input/output 530, and a storage device 540 such as an in-memory storage, and the like. Although not shown in FIG. 5, the computing system 500 may also include or be electronically connected to other components such as a display, an input unit(s), a receiver, a transmitter, a persistent disk, and the like. The processor 520 may control the other components of the computing system 500.

The network interface 510 may transmit and receive data over a network such as the Internet, a private network, a public network, an enterprise network, and the like. The network interface 510 may be a wireless interface, a wired interface, or a combination thereof. The processor 520 may include one or more processing devices each including one or more processing cores. In some examples, the processor 520 is a multicore processor or a plurality of multicore processors. Also, the processor 520 may be fixed or it may be reconfigurable. The input/output 530 may include an interface, a port, a cable, a bus, a board, a wire, and the like, for inputting and outputting data to and from the computing system 500. For example, data may be output to an embedded display of the computing system 500, an externally connected display, a display connected to the cloud, another device, and the like. The network interface 510, the input/output 530, the storage 540, or a combination thereof, may interact with applications executing on other devices.

The storage device 540 is not limited to a particular storage device and may include any known memory device such as RAM, ROM, hard disk, and the like, and may or may not be included within a database system, a cloud environment, a web server, or the like. The storage 540 may store software modules or other instructions which can be executed by the processor 520 to perform the method shown in FIG. 4. According to various embodiments, the storage 540 may include a data store having a plurality of tables, partitions and sub-partitions. The storage 540 may be used to store database records, items, entries, and the like. In some embodiments, the storage 540 may be configured to store instructions for implementing a trust service engine as described herein, which when executed, cause the processor 520 to carry out the functionality of the trust service engine.

According to various embodiments, the network interface 510 may be configured to receive sensor data of an object that is in a multi-party transactional process. For example, the sensor data may include temperature, pressure, humidity, geo-location, damage information, velocity, and the like. The sensor data may be captured by various IoT sensors such as radio-frequency identifiers (RFID), hardware sensors, thermometers, and the like. The processor 520 may be configured to identify dynamic context of the object based on a current position of the object within the multi-party transactional process, generate a data block comprising the received sensor data of the object and the identified dynamic context of the object, and store the data block within a blockchain on an immutable distributed ledger.

In some embodiments, the processor 520 may dynamically identify one or more of a type of material of the object, a vehicle identifier of a current transport, a party identifier, and an order identifier. In some embodiments, the processor 520 may dynamically identify which party within the multi-party transactional process currently has possession of the object. In some embodiments, the processor 520 may dynamically identify a change in possession of the object from one party to another party in the multi-party transactional process.

In some embodiments, the object may include a temperature-controlled object such as perishable goods, pharmaceuticals, chemicals, and the like, and the sensor data comprise temperature data. In this example, the multi-party transactional process may be a cold chain where each party is required to keep the object at or below a predetermined temperature. Here, the processor 520 may determine whether a current temperature at the current position of the object satisfies a predetermined temperature constraint.

In some embodiments, the processor 520 may determine that the dynamically identified context of the object violates a pre-established constraint of the multi-party transactional process, and control the network interface to transmit an alert to one or more parties of the multi-party transactional process indicating that the pre-established constraint has been violated. In some embodiments, the processor 520 may store information about the violation of the pre-established constraint within a data block in the blockchain on the immutable distributed ledger.

As will be appreciated based on the foregoing specification, the above-described examples of the disclosure may be implemented using computer programming or engineering techniques including computer software, firmware, hardware or any combination or subset thereof. Any such resulting program, having computer-readable code, may be embodied or provided within one or more non-transitory computer-readable media, thereby making a computer program product, i.e., an article of manufacture, according to the discussed examples of the disclosure. For example, the non-transitory computer-readable media may be, but is not limited to, a fixed drive, diskette, optical disk, magnetic tape, flash memory, external drive, semiconductor memory such as read-only memory (ROM), random-access memory (RAM), and/or any other non-transitory transmitting and/or receiving medium such as the Internet, cloud storage, the Internet of Things (IoT), or other communication network or link. The article of manufacture containing the computer code may be made and/or used by executing the code directly from one medium, by copying the code from one medium to another medium, or by transmitting the code over a network.

The computer programs (also referred to as programs, software, software applications, "apps", or code) may include machine instructions for a programmable processor, and may be implemented in a high-level procedural and/or object-oriented programming language, and/or in assembly/machine language. As used herein, the terms "machine-readable medium" and "computer-readable medium" refer to any computer program product, apparatus, cloud storage, internet of things, and/or device (e.g., magnetic discs, optical disks, memory, programmable logic devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal that may be used to provide machine instructions and/or any other kind of data to a programmable processor.

The above descriptions and illustrations of processes herein should not be considered to imply a fixed order for performing the process steps. Rather, the process steps may be performed in any order that is practicable, including simultaneous performance of at least some steps. Although the disclosure has been described in connection with specific examples, it should be understood that various changes, substitutions, and alterations apparent to those skilled in the art can be made to the disclosed embodiments without departing from the spirit and scope of the disclosure as set forth in the appended claims.

What is claimed is:

1. A computing system comprising:
   a network interface configured to receive sensor data comprising time-series measurements captured of an object that is in a multi-party transactional process; and
   a processor configured to
   correlate the received sensor data with business data from a data store based on a common attribute between the received sensor data and the business data;
   dynamically identify a party of the multi-party transactional process that is in possession of the object based on the received sensor data and the correlated business data,
   determine that the dynamically identified party is in violation of a predefined constraint of the multi-party transactional process based on a comparison of the received sensor data to one or more rules of the multi-party transactional process, wherein a violation of the predefined constraint occurs when the time-series measurements captured from the object are outside of the conditions defined in the one or more rules of the multi-party transactional process,
   generate a data block comprising the time-series measurements of the object, paired with an identifier of the dynamically identified party,
   store information about the violation of the predefined constraint within the data block,
   store the data block within a blockchain on a distributed ledger, and
   transmit an alert to one or more parties of the multi-party transactional process indicating the predefined constraint has been violated.

2. The computing system of claim 1, wherein the network interface is configured to receive one or more of temperature, vibration, pressure, and geo-location measurements captured of the object at a current position within the multi-party transactional process.

3. The computing system of claim 1, wherein the processor is further configured to dynamically identify context including one or more of a type of material of the object, a vehicle identifier of a current transport, a party identifier, and an order identifier based on the received sensor data and the correlated business data of the party obtained from the data store, and add the context to the data block before storing the data block on the blockchain.

4. The computing system of claim 1, wherein the processor is configured to correlate the received sensor data and the business data from the data store based on one or more of time and location within the received sensor data and the business data.

5. The computing system of claim 1, wherein the processor is configured to dynamically identify a change in possession of the object from one party to another party in the multi-party transactional process based on the received sensor data and the correlated business data of the party obtained from the data store, and record the change in possession in the blockchain on the distributed ledger.

6. The computing system of claim 1, wherein the object comprises a temperature-controlled object, the sensor data comprise temperature data, and the processor is configured to determine whether a current temperature at the current position of the object satisfies a predetermined temperature constraint based on the received sensor data and the correlated business data of the party obtained from the data store.

7. The computing system of claim 1, wherein the processor is configured to determine that the object the predefined constraint of the multi-party transactional process, based on a comparison of a temperature value and a duration of time value within the received sensor data in comparison to the one or more rules of the multi-party transactional process.

8. The computing system of claim 1, wherein the processor is configured to dynamically identify the party of the multi-party transactional process that is in possession of the object based on a point in time of a change in possession between two parties of the multi-party transactional processes identified from the business data in a correlated sales order.

9. A method comprising:
   receiving sensor data comprising time-series measurements captured of an object that is in a multi-party transactional process;
   correlating the received sensor data with business data from a data store based on a common attribute between the received sensor data and the business data;
   dynamically identifying a party of the multi-party transactional process that is in possession of the object based on the received sensor data and the correlated business data;
   determining that the dynamically identified party is in violation of a predefined constraint of the multi-party transactional process based on a comparison of the received sensor data to one or more rules of the multi-party transactional process, wherein a violation of the predefined constraint occurs when the time-series measurements captured from the object are outside of the conditions defined in the one or more rules of the multi-party transactional process;
   generating a data block comprising the time-series measurements of the object paired with an identifier of the dynamically identified party;
   storing information about the violation of the predefined constraint within the data block;
   storing the data block within a blockchain on a distributed ledger; and transmitting an alert to one or more parties of the multi-party transactional process indicating the predefined constraint has been violated.

10. The method of claim 9, wherein the receiving the sensor data comprises receiving one or more of temperature, vibration, pressure, and geo-location measurement captured of the object at a current position within the multi-party transactional process.

11. The method of claim 9, wherein the dynamically identifying further comprises identifying context including one or more of a type of material of the object, a vehicle identifier of a current transport, a party identifier, and an order identifier, and adding the context to the data block before storing the data block on the blockchain.

12. The method of claim 9, wherein the correlating comprises correlating the received sensor data and the business data from the data store based on one or more of time and location within the received sensor data and the business data.

13. The method of claim 9, wherein the dynamically identifying comprises dynamically identifying a change in possession of the object from one party to another party in the multi-party transactional process based on the received sensor data and the correlated business data of the party obtained from the data store, and recording the change in possession in the blockchain on the distributed ledger.

14. The method of claim 9, wherein the object comprises a temperature-controlled object, the sensor data comprise temperature data, and the dynamically identifying comprises determining whether a current temperature at the current position of the object satisfies a predetermined temperature constraint based on the received sensor data and the correlated business data of the party obtained from the data store.

15. The method of claim 9, wherein the determining comprises determining that the object violates the predefined constraint of the multi-party transactional process based on a comparison of a temperature value and a duration of time value within the received sensor data in comparison to the one or more rules of the multi-party transactional process.

16. A non-transitory computer-readable medium storing instructions which when executed by a processor cause a computer to perform:
receiving sensor data comprising time-series measurements captured of an object that is in a multi-party transactional process;
correlating the received sensor data with business data from a data store based on a common attribute between the received sensor data and the business data;
dynamically identifying a party of the multi-party transactional process that is in possession of the object based on the received sensor data and the correlated business data;
determining that the dynamically identified party is in violation of a predefined constraint of the multi-party transactional process based on a comparison of the received sensor data to one or more rules of the multi-party transactional process, wherein a violation of the predefined constraint occurs when the time-series measurements captured from the object are outside of the conditions defined in the one or more rules of the multi-party transactional process;
generating a data block comprising the time-series measurements of the object paired with an identifier of the dynamically identified party;
storing information about the violation of the predefined constraint within the data block;
storing the data block within a blockchain on a distributed ledger; and
transmitting an alert to one or more parties of the multi-party transactional process indicating the predefined constraint has been violated.

17. The non-transitory computer-readable medium of claim 16, wherein the receiving the sensor data comprises receiving one or more of temperature, vibration, pressure, and geo-location measurements captured of the object at a current position within the multi-party transactional process.

18. The non-transitory computer-readable medium of claim 16, wherein the dynamically identifying further comprises identifying context including one or more of a type of material of the object, a vehicle identifier of a current transport, a party identifier, and an order identifier based on the received sensor data and the correlated business data of the party obtained from the data store, and adding the context to the data block before storing the data block on the blockchain.

19. The non-transitory computer-readable medium of claim 16, wherein the correlating comprises correlating the received sensor data and the business data from the data store based on one or more of time and location attributes within the received sensor data and the business data.

* * * * *